United States Patent
Ahn

(10) Patent No.: US 11,829,802 B2
(45) Date of Patent: Nov. 28, 2023

(54) COMPUTING SYSTEM AND DATA PROCESSING SYSTEM INCLUDING A COMPUTING SYSTEM

(71) Applicant: SK hynix Inc., Icheon-si (KR)

(72) Inventor: Soo Hong Ahn, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 76 days.

(21) Appl. No.: 17/398,160

(22) Filed: Aug. 10, 2021

(65) Prior Publication Data

US 2021/0373964 A1 Dec. 2, 2021

Related U.S. Application Data

(62) Division of application No. 16/210,362, filed on Dec. 5, 2018, now Pat. No. 11,093,295.

(30) Foreign Application Priority Data

Apr. 18, 2018 (KR) .................. 10-2018-0044780

(51) Int. Cl.
*G06F 9/50* (2006.01)
*G06F 9/48* (2006.01)
(Continued)

(52) U.S. Cl.
CPC .......... *G06F 9/5072* (2013.01); *G06F 9/4843* (2013.01); *G06F 9/5016* (2013.01); *G06F 12/1072* (2013.01); *H04L 67/10* (2013.01); *H04L 67/60* (2022.05); *G06F 2209/5011* (2013.01); *G06F 2212/657* (2013.01)

(58) Field of Classification Search
CPC ....... H04L 67/10; H04L 67/60; G06F 9/5072; G06F 9/4843; G06F 9/5016; G06F 12/1072; G06F 2209/5011; G06F 2212/657; G06F 9/5027; G06F 2212/1016; G06F 2212/154;
(Continued)

(56) References Cited

U.S. PATENT DOCUMENTS 9,166,897 B1 * 10/2015 Sharma ............... H04L 43/0817
9,535,606 B2    1/2017 Krithivas et al.
(Continued)

FOREIGN PATENT DOCUMENTS

CN    102546782 A   7/2012
JP    2003030169 A  1/2003
(Continued)

*Primary Examiner* — El Hadji M Sall
(74) *Attorney, Agent, or Firm* — WILLIAM PARK & ASSOCIATES LTD.

(57) ABSTRACT

A data processing system includes at least one pooled memory node, at least one processing node, and a switch node coupled to the at least one pooled memory node and the at least one processing node. The data processing system also includes a master node configured to transmit task information to a first processing node among the at least one processing node through the switch node and configured to transmit a memory address range of a first pooled memory node among the at least one pooled memory node to the switch node. The switch node processes a first memory access request transmitted by the first processing node based on the task information, for the first pooled memory node, based on the memory address range.

20 Claims, 12 Drawing Sheets

(51) Int. Cl.
*H04L 67/10* (2022.01)
*G06F 12/1072* (2016.01)
*H04L 67/60* (2022.01)

(58) Field of Classification Search
CPC ............. G06F 2212/502; G06F 9/5005; G06F 12/0246
See application file for complete search history.

(56) References Cited

U.S. PATENT DOCUMENTS

| | | | |
|---|---|---|---|
| 2004/0230762 | A1 | 11/2004 | Allen et al. |
| 2009/0254960 | A1* | 10/2009 | Yarom ............... H04L 65/1043 725/115 |
| 2016/0034191 | A1 | 2/2016 | Kinoshita et al. |
| 2016/0179383 | A1 | 6/2016 | Krithivas et al. |
| 2016/0283399 | A1 | 9/2016 | Sharma |
| 2018/0077235 | A1 | 3/2018 | Nachimuthu et al. |
| 2019/0004800 | A1 | 1/2019 | Ong et al. |

FOREIGN PATENT DOCUMENTS

| | | |
|---|---|---|
| KR | 1020060097532 A | 9/2006 |
| KR | 1020180027646 A | 3/2018 |
| TW | I519958 B | 2/2016 |
| TW | I570565 B | 2/2017 |
| TW | 201738754 A | 11/2017 |

\* cited by examiner

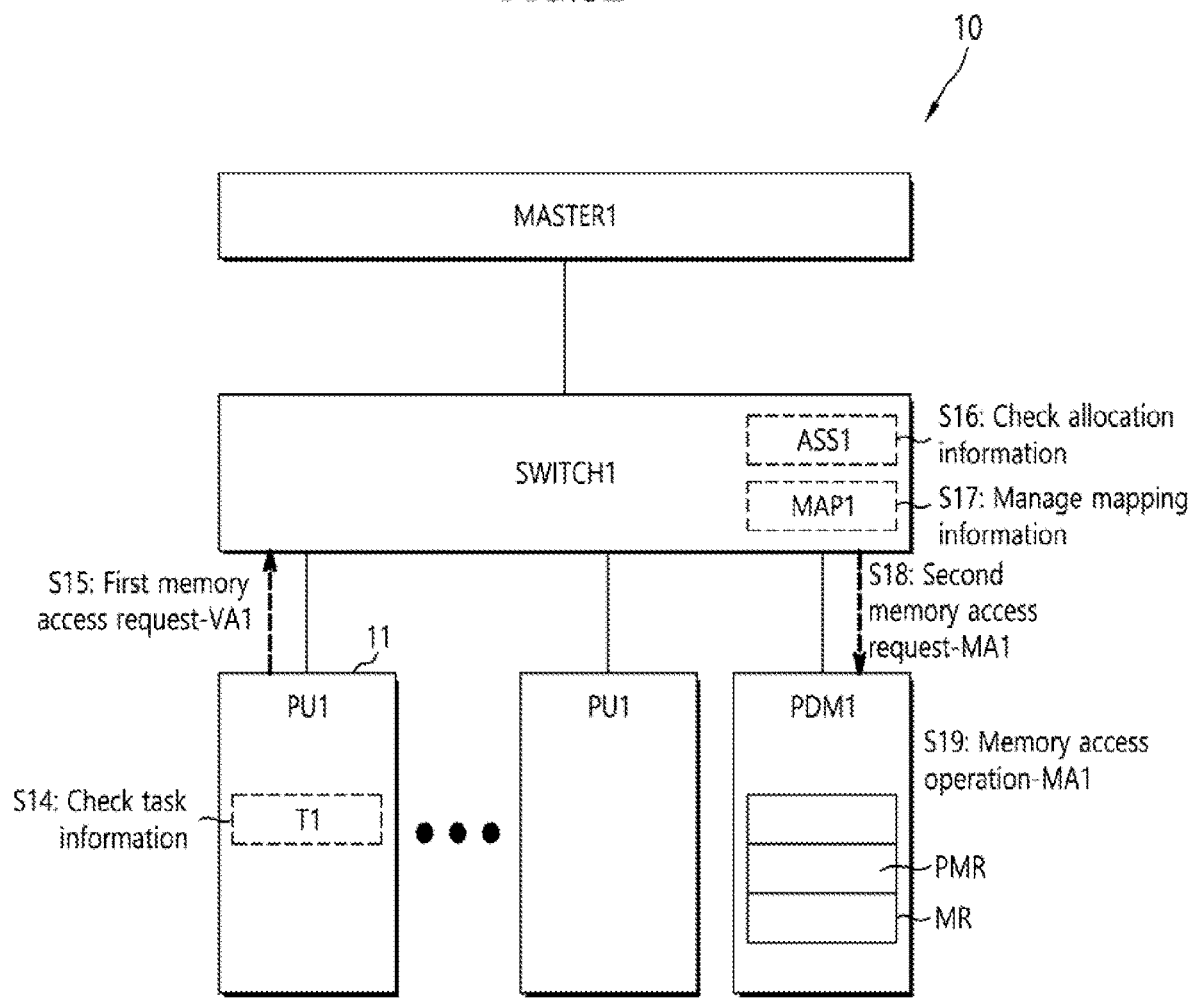

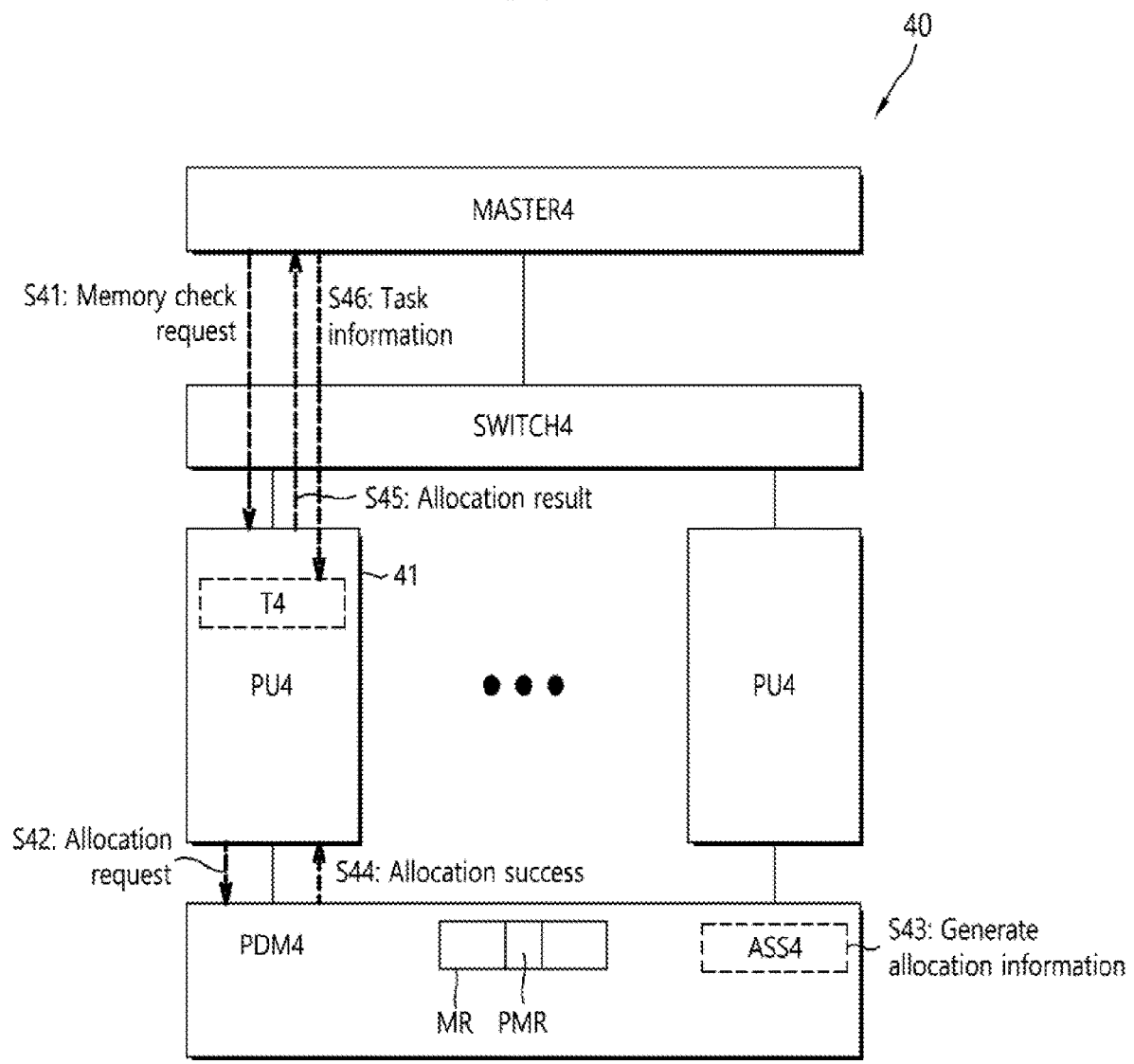

COMPUTING SYSTEM AND DATA PROCESSING SYSTEM INCLUDING A COMPUTING SYSTEM

CROSS-REFERENCES TO RELATED APPLICATION

The present application is a divisional application of U.S. patent application Ser. No. 16/210,362, filed on Dec. 5, 2018, and claims priority under 35 U.S.C. § 119(a) to Korean application number 10-2018-0044780, filed on Apr. 18, 2018, in the Korean Intellectual Property Office, which is incorporated herein by reference in its entirety.

BACKGROUND

1. Technical Field

Various embodiments generally relate to a data processing system and, more particularly, to a data processing system including a pooled memory.

2. Related Art

With the fourth industrial revolution, the volume of data is increasing exponentially. Various kinds of services capable of processing data are being introduced and big data-based applications, such as machine learning, are continuously being developed.

In accordance with this trend, the importance of data processing systems, e.g., data centers capable of storing and processing vast amounts of data, is growing with time. In particular, various structures of data processing systems have been proposed to improve the processing performance of the data processing systems, that is, improving the speed of processing an externally requested task and providing resulting data.

SUMMARY

In an embodiment, a data processing system may include at least one pooled memory node, at least one processing node, and a switch node coupled to the at least one pooled memory node and the at least one processing node. The data processing system may further include a master node configured to transmit task information to a first processing node among the at least one processing node through the switch node and configured to transmit a memory address range of a first pooled memory node among the at least one pooled memory node to the switch node. The switch node processes a first memory access request transmitted by the first processing node based on the task information, for the first pooled memory node, based on the memory address range.

In an embodiment, a data processing system may include at least one processing node and a switch node coupled to the respective at least one processing node, wherein the switch node includes a pooled memory. The data processing system may also include a master node configured to transmit task information to a first processing node among the at least one processing node through the switch node and configured to transmit a memory address range of the pooled memory to the switch node. The switch node processes a memory access request transmitted by the first processing node, for the pooled memory, based on the memory address range.

In an embodiment, a data processing system may include at least one pooled memory node and at least one processing node each coupled to a respective pooled memory node of the at least one memory node. The data processing system may also include a switch node coupled to the at least one pooled memory node and the at least one processing node. The data processing system may further include a master node configured to communicate with the at least one processing node and the at least one pooled memory node through the switch node, allocate a memory address range of a first pooled memory node among the at least one pooled memory node to a first processing node among the at least one processing node, and transmit the memory address range to the first pooled memory node through the switch node. The first pooled memory node processes a memory access request transmitted by the first processing node, based on the memory address range.

In an embodiment, a computing system may include at least one pooled memory node, at least one processing node each coupled to a respective pooled memory node of the at least one pooled memory node, and a switch node coupling the at least one pooled memory node and the at least one processing node with an external master node. A first processing node among the at least one processing node receives task information from the master node through the switch node. A first pooled memory node among the at least one pooled memory node receives a memory address range from the master node through the switch node, and processes a memory access request transmitted based on the task information by the first processing node, based on the memory address range.

In an embodiment, a data processing system may include: at least one pooled memory node, at least one processing node each coupled to a respective pooled memory node of the at least one pooled memory node, and a switch node coupled to the at least one processing node. The data processing system may also include a master node configured to communicate with the at least one processing node through the switch node, and configured to control a first processing node among the at least one processing node to be allocated with a memory capacity for task processing, directly from the at least one pooled memory node, thereby delegating the task processing to the first processing node.

In an embodiment, a data processing system may include at least one pooled memory node, at least one processing node each coupled to a respective pooled memory node of the at least one pooled memory node, and a switch node coupled to the at least one processing node. The data processing system may further include a master node configured to communicate with the at least one processing node through the switch node, and configured to delegate task processing to a first processing node among the at least one processing node. A first pooled memory node among the at least one pooled memory node allocates a memory address range to the first processing node in response to a memory allocation request of the first processing node, and processes a memory access request transmitted by the first processing node for the task processing, based on the memory address range.

In an embodiment, a computing system may include at least one pooled memory nodes, at least one processing node each coupled to a respective pooled memory node of the at least one pooled memory node, and a switch node configured to couple the at least one processing node with an external master node. A first processing node among the at least one processing node is delegated with task processing under control of the master node through the switch node. A first pooled memory node among the at least one pooled memory node allocates a memory address range to the first processing node in response to a memory allocation request of the first processing node, and processes a memory access request transmitted by the first processing node for the task processing, based on the memory address range.

BRIEF DESCRIPTION OF THE DRAWINGS

FIGS. 3A and 3B show diagrams to assist in the explanation of a method for operating the data processing system of FIG. 2 in accordance with an embodiment.

FIGS. 8A and 8B show diagrams to assist in the explanation of a method for operating the data processing system of FIG. 7 in accordance with an embodiment.

DETAILED DESCRIPTION

Figure 1:
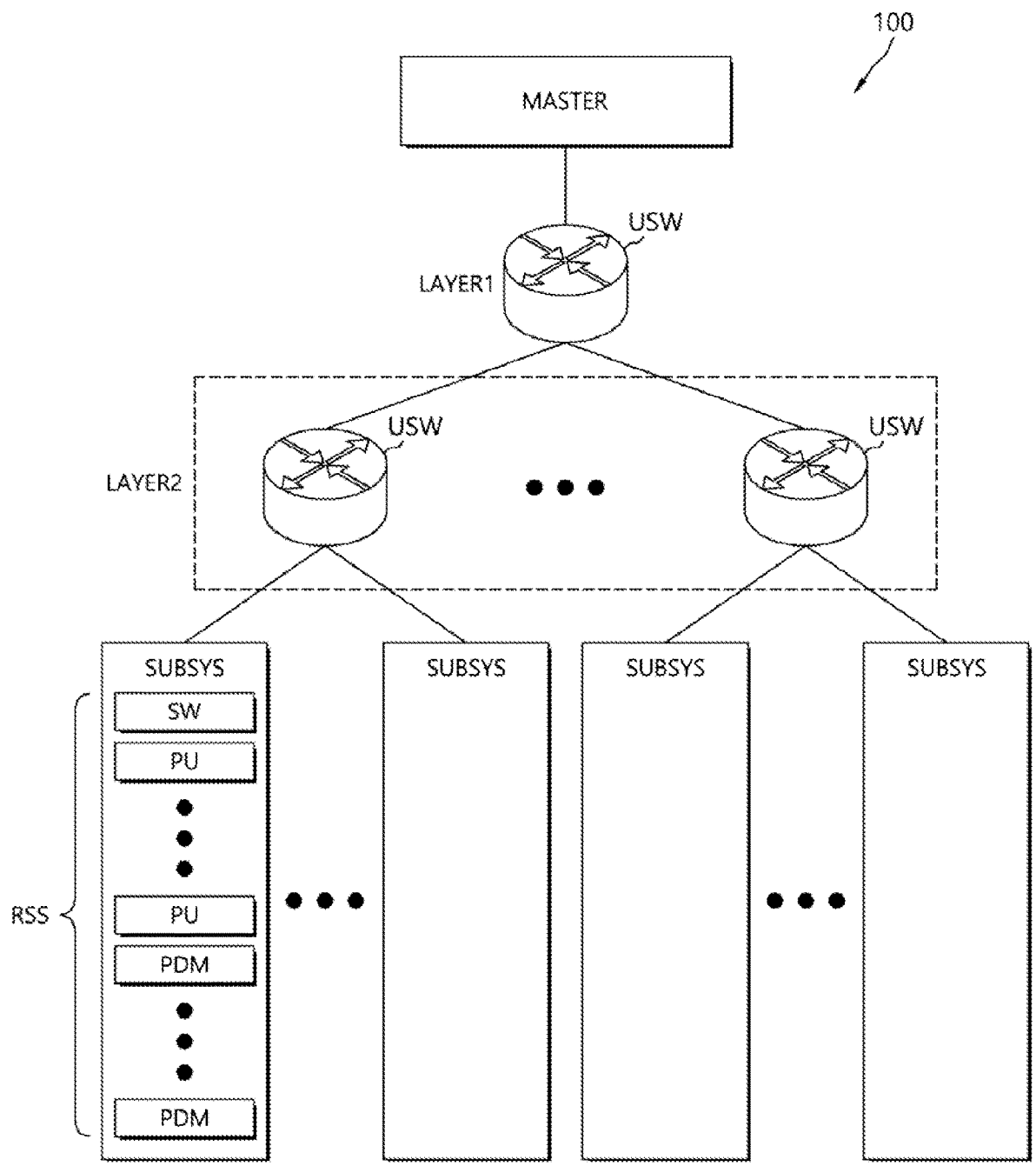
FIG. 1 shows a block diagram of a data processing system in accordance with an embodiment.

In the present disclosure, advantages, features, and methods for achieving them will become more apparent after a reading of the following presented embodiments taken in conjunction with the accompanying drawings. The present teachings may, however, be embodied in different forms and should not be construed as being limited to the embodiments set forth herein. Rather, the presented embodiments are provided to describe the present teachings in detail to the extent that a person skilled in the art to which the disclosure pertains can easily carry out the technical ideas of the present disclosure.

It is to be understood that embodiments of the present disclosure are not limited to the particulars shown in the drawings, and that the drawings are not necessarily to scale. In some instances proportions may be exaggerated in order to more clearly depict certain features of the disclosure. While particular terminology is used herein, it is to be appreciated that the terminology is used for the purpose of describing particular embodiments only and is not intended to limit the scope of the present disclosure.

As used herein, the term "and/or" includes any and all combinations of one or more of the associated listed items. It will be understood that when an element is referred to as being "on," "connected to," or "coupled to" another element, it may be directly on, connected, or coupled to the other element, or intervening elements may be present. As used herein, the singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements.

Hereinafter, a computing system and a data processing system including a computing system are described below with reference to the accompanying drawings through various presented embodiments.

FIG. 1 shows a block diagram of a data processing system 100 in accordance with an embodiment.

Referring to FIG. 1, the data processing system 100 as an electronic system capable of processing data may include a data center, an Internet data center, a personal computer, a laptop computer, a smartphone, a tablet computer, a digital camera, a game console, a navigation, a virtual reality device, a wearable device, etc.

As shown the data processing system 100 may include a master node MASTER, upper switch nodes USW, and sub systems SUBSYS.

The master node MASTER may be coupled with the sub systems SUBSYS through the upper switch nodes USW.

The upper switch nodes USW may be coupled in the structure of a plurality of layers, for example, the structure of two layers. The structure of two layers is merely an example, and the structure of three or more layers is also possible. The upper switch node USW of a first layer LAYER1 may couple the master node MASTER and the upper switch nodes USW of a second layer LAYER2. Each of the upper switch nodes USW of the second layer LAYER2 may be coupled with corresponding sub systems SUBSYS among the plurality of sub systems SUBSYS.

The master node MASTER may control the sub systems SUBSYS. The master node MASTER may manage and control resources RSS included in the sub systems SUBSYS. The master node MASTER may grasp all the statuses of the resources RSS of the sub systems SUBSYS. Therefore, the master node MASTER may delegate task processing to a processing node PU by allocating a partial memory region of a pooled memory node PDM to the processing node PU.

According to an embodiment, the master node MASTER may delegate task processing to at least one processing node PU selected in at least one sub system SUBSYS. The master node MASTER may delegate task processing to a plurality of processing nodes PU by dividing one task that is generated.

According to an embodiment, depending on the coupling structure of resources RSS, the master node MASTER might not allocate a partial memory region of a pooled memory node PDM, and processing nodes PU may directly request allocation of partial memory regions to pooled memory nodes PDM. The master node MASTER may delegate task processing to a corresponding processing node PU depending on whether the processing node PU succeeds in allocation of a partial memory region of a pooled memory node PDM.

Each of the upper switch nodes USW of the first layer LAYER1 and the second layer LAYER2 may check an address from a signal transmitted from the master node MASTER, and may transmit the corresponding signal to a sub system SUBSYS corresponding to the address.

Each of the sub systems SUBSYS may include a switch node SW, one or more processing nodes PU, and one or more pooled memory nodes PDM. Each of the sub systems SUBSYS may be a computing system for an embodiment.

The switch node SW may perform an information transfer operation and an access control operation between the master node MASTER and the other resources of the sub system SUBSYS, that is, the processing nodes PU and the pooled memory nodes PDM. According to an embodiment, the switch node SW may be restricted in some functions depending on the coupling structure of the data processing system 100. In detail, the switch node SW may be restricted in some functions by being not coupled with the pooled memory nodes PDM.

Each of the processing nodes PU may be delegated with task processing from the master node MASTER, and may process a task. Each of the processing nodes PU may be allocated with a partial memory region of a pooled memory node PDM, and may process a task by using the partial memory region. The allocation of a partial memory region may be performed by the master node MASTER or may be performed by a processing node PU which is delegated with task processing.

Each of the processing nodes PU may include a central processing unit, a graphic processing unit, a microprocessor, an application processor, an accelerated processing unit, and/or an operating system.

The pooled memory nodes PDM as a kind of shared memories may be used by processing nodes PU which are processing tasks. That is to say, the pooled memory nodes PDM are not exclusively dedicated to or are not exclusively used by only one processing node PU. According to an embodiment, the pooled memory nodes PDM included in a sub system SUBSYS may be used even by the processing nodes PU of another sub system SUBSYS.

Each of the pooled memory nodes PDM may include a memory system such as a Personal Computer Memory Card International Association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive (SSD).

According to an embodiment, each of the of the pooled memory nodes PDM may include a nonvolatile memory device such as a flash memory device like as a NAND flash and a NOR flash, an FeRAM (ferroelectric random access memory), a PCRAM (phase change random access memory), an MRAM (magnetic random access memory), and an ReRAM (resistive random access memory).

According to an embodiment, each of the pooled memory nodes PDM may include a volatile memory device such as a DRAM (dynamic random access memory) and an SRAM (static random access memory).

According to an embodiment, each of the sub systems SUBSYS may further include a mass storage.

According to an embodiment, each of the sub systems SUBSYS may correspond to a server rack. Further, the resources RSS may be servers which are installed on the shelves of the server rack.

According to an embodiment, the nodes of the data processing system 100 may be configured by hardware, software or a combination of hardware and software.

Hereafter, various structures and operating methods of the data processing system 100 in accordance with embodiments are described in detail.

Figure 2:
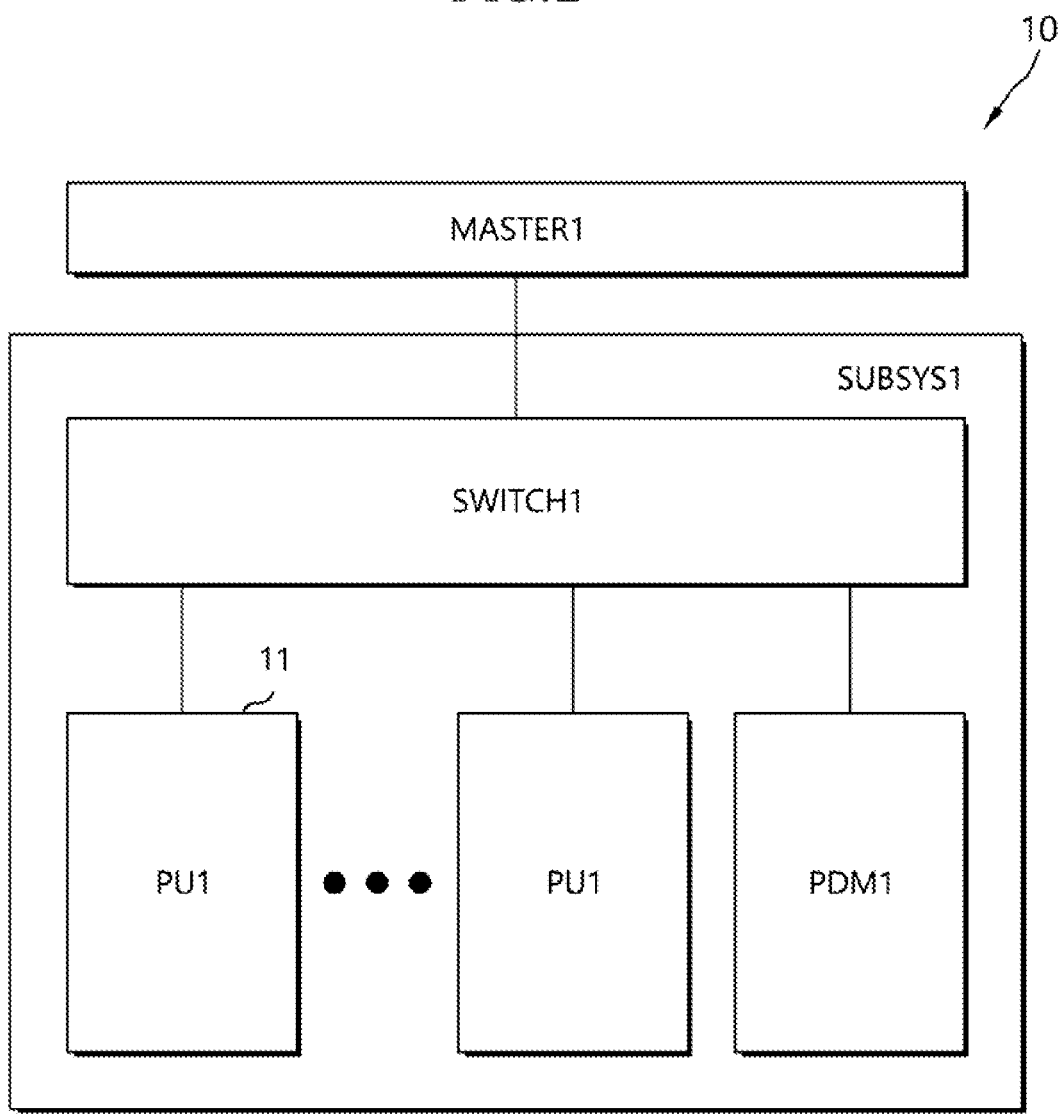
FIG. 2 shows a block diagram of a data processing system in accordance with an embodiment.

FIG. 2 shows a block diagram illustrating a representation of an example of a data processing system 10 in accordance with an embodiment.

Referring to FIG. 2, the data processing system 10 may include a master node MASTER1 and a sub system SUBSYS1.

The master node MASTER1 may be coupled with the sub system SUBSYS1. While not shown, the data processing system 10 may further include one or more upper switch nodes between the master node MASTER1 and a switch node SWITCH1. The information received by the switch node SWITCH1 from the master node MASTER1 may be transmitted through the upper switch nodes not shown. Also, while not shown, the data processing system 10 may include a plurality of sub system SUBSYS1. Moreover, while not shown, the sub system SUBSYS1 may include a plurality of pooled memory nodes. This also applies to all embodiments described herein below.

The sub system SUBSYS1 may include the switch node SWITCH1, one or more processing nodes PU1, and a pooled memory node PDM1.

The switch node SWITCH1 may be coupled with the master node MASTER1. The switch node SWITCH1 may be coupled with the master node MASTER1 through one or more upper switch nodes. The switch node SWITCH1 may be coupled to the processing nodes PU1 and the pooled memory node PDM1.

The processing nodes PU1 may be coupled with the pooled memory node PDM1 through the switch node SWITCH1.

The master node MASTER1 may perform a task delegating operation to the processing nodes PU1 and the pooled memory node PDM1 when a task is generated. In detail, the master node MASTER1 may determine to delegate task processing to any one of the processing nodes PU1, for example, a processing node 11. The master node MASTER1 may determine a memory address range to be allocated to the processing node 11, in the pooled memory node PDM1. That is to say, the master node MASTER1 may determine a partial memory region to be allocated to the processing node 11, in the entire memory region of the pooled memory node PDM1. Because the master node MASTER1 manages the statuses of all resources, the master node MASTER1 may determine the processing node 11 to which task processing is to be delegated and the memory address range to be allocated to the processing node 11.

The master node MASTER1 may transmit allocation information on the processing node 11 and the pooled memory node PDM1 to the switch node SWITCH1. The allocation information may include the identification information of the processing node 11 and the memory address range of the partial memory region allocated to the processing node 11 in the pooled memory node PDM1.

The master node MASTER1 may transmit task information to the processing node 11 to which task processing is to be delegated. The task information may include a memory capacity corresponding to the memory address range allocated to the processing node 11 in the pooled memory node PDM1. In other words, the task information may include the memory capacity of the partial memory region allocated to the processing node 11 in the entire memory region of the pooled memory node PDM1. Also, the task information may include the contents of the task delegated to the processing node 11. Meanwhile, the transmission of the task information to the processing node 11 by the master node MASTER1 may be processed by the information transfer operation of the switch node SWITCH1 as is described later.

Meanwhile, the task information might not include the memory address range allocated to the processing node 11 in the pooled memory node PDM1. Namely, the master node MASTER1 may notify the processing node 11 of, instead of the memory address range of the pooled memory node PDM1, the memory capacity corresponding to the memory address range, thereby allowing the processing node 11 to use a virtual address range depending on the memory capacity, as is described later.

The switch node SWITCH1 may perform the information transfer operation between the master node MASTER1 and the processing nodes PU1 and the pooled memory node PDM1. In detail, when the master node MASTER1 transmits the task information to the processing node 11, the switch node SWITCH1 may transmit the task information transmitted from the master node MASTER1, to the processing node 11 through the information transfer operation.

When the processing node 11 performs a task processing operation, the switch node SWITCH1 may process a first memory access request transmitted from the processing node 11.

In detail, when the processing node 11 performs the task processing operation, the switch node SWITCH1 may check the allocation information on the processing node 11 in response to the first memory access request transmitted from the processing node 11. The switch node SWITCH1 may check the identification information of the processing node 11 in the allocation information, and may compare it with the identification information of the processing node 11 included in the first memory access request.

The switch node SWITCH1 may check the memory address range of the pooled memory node PDM1 allocated to the processing node 11, in the allocation information. The switch node SWITCH1 may convert the virtual address included in the first memory access request, into a memory address included in the memory address range of the allocation information. The switch node SWITCH1 may manage the mapping information between the virtual address and the memory address. The switch node SWITCH1 may transmit a second memory access request for the converted memory address, to the pooled memory node PDM1.

The processing node 11 may process the task delegated from the master node MASTER1, by performing the task processing operation. In order to perform the task processing operation, the processing node 11 may check the task information transmitted from the master node MASTER1. The processing node 11 may determine to use a predetermined virtual address range, by checking the task information. The virtual address range may correspond to the allocated memory capacity included in the task information.

The processing node 11 may transmit the first memory access request to the switch node SWITCH1. The first memory access request may include the virtual address. The virtual address may be included in the virtual address range that is determined to be used in task processing, by the processing node 11. The virtual address is converted into the memory address of the pooled memory node PDM1 by the switch node SWITCH1.

The pooled memory node PDM1 may receive the second memory access request from the switch node SWITCH1, and may perform a memory access operation for the memory address included in the second memory access request.

Figure 3A:
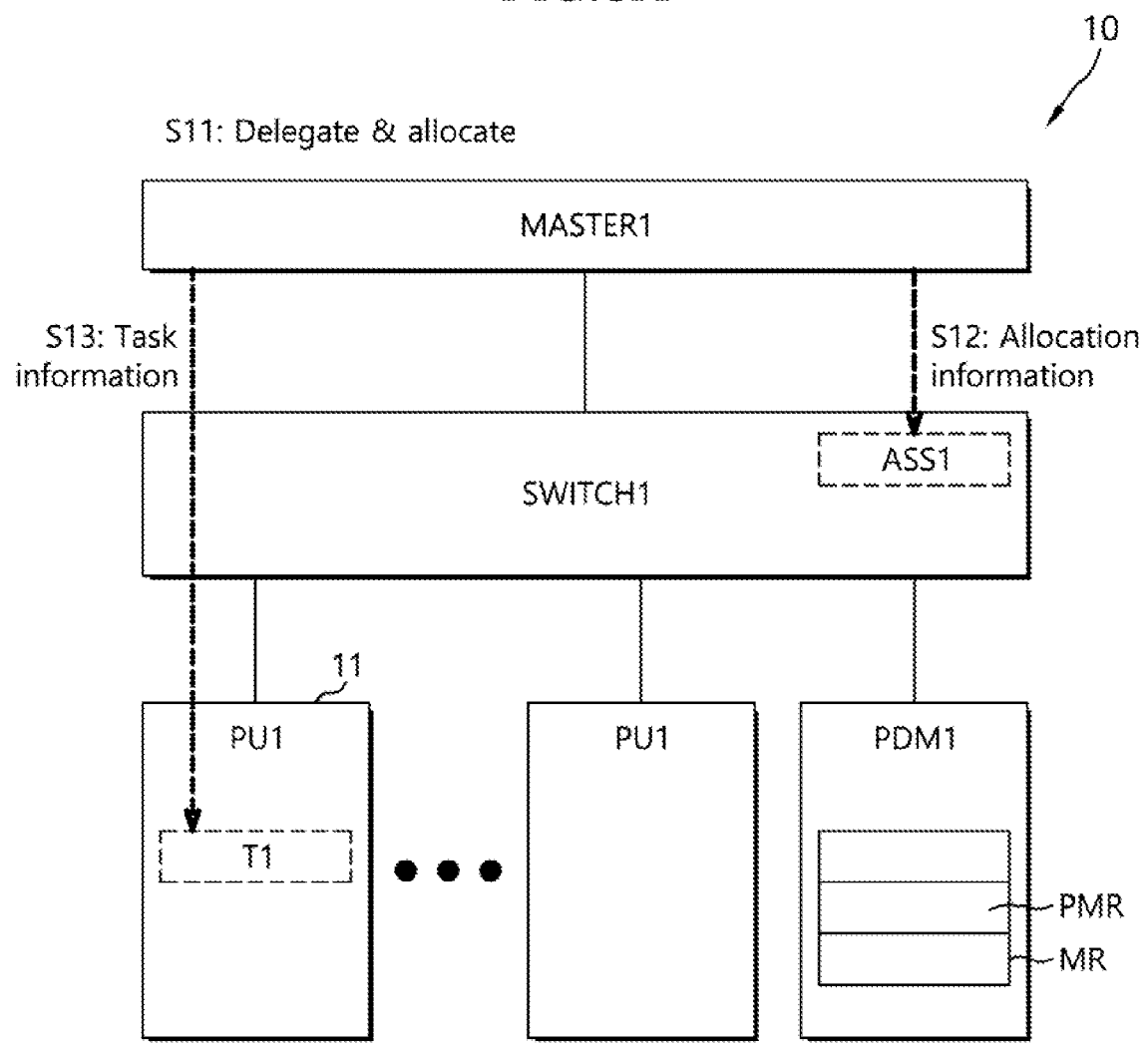

FIGS. 3A and 3B show diagrams to assist in the explanation of a method for operating the data processing system 10 of FIG. 2 in accordance with an embodiment. In FIG. 3A, the master node MASTER1 may perform a task delegating operation, and in FIG. 3B, the processing node 11 may perform a task processing operation.

Referring to FIG. 3A, for operation S11, the master node MASTER1 may determine to delegate task processing to the processing node 11. The master node MASTER1 may determine a memory address range to be allocated to the processing node 11, in the pooled memory node PDM1. That is to say, the master node MASTER1 may determine a partial memory region PMR to be allocated to the processing node 11, in an entire memory region MR of the pooled memory node PDM1.

For operation S12, the master node MASTER1 may transmit allocation information ASS1 on the processing node 11 and the pooled memory node PDM1 to the switch node SWITCH1. The allocation information ASS1 may include the identification information of the processing node 11 and the memory address range of the partial memory region PMR. The switch node SWITCH1 may store the allocation information ASS1 in an internal memory.

For operation S13, the master node MASTER1 may transmit task information T1 to the processing node 11. The task information T1 may include the memory capacity of the partial memory region PMR allocated to the processing node 11 and the contents of a task that is delegated to the processing node 11. The processing node 11 may store the task information T1 in an internal memory. On the other hand, the switch node SWITCH1 may transmit the task information T1 transmitted from the master node MASTER1, to the processing node 11 through an information transfer operation.

Meanwhile, the operation S13 may be performed after the operation S12 is performed, or vice versa.

Referring to FIG. 3B, for operation S14, the processing node 11 may check the task information T1 to perform the task processing operation. The processing node 11 may determine to use a predetermined virtual address range, by checking the task information T1. The virtual address range may correspond to the memory capacity of the partial memory region PMR included in the task information T1.

For operation S15, the processing node 11 may transmit a first memory access request to the switch node SWITCH1. The first memory access request may include a virtual address VA1. The virtual address VA1 may be included in the virtual address range that is determined to be used in task processing.

For operation S16, the switch node SWITCH1 may check the allocation information ASS1 on the processing node 11 in response to the first memory access request transmitted from the processing node 11. The switch node SWITCH1 may check the identification information of the processing node 11 in the allocation information ASS1, and may compare it with the identification information of the processing node 11 included in the first memory access request. The switch node SWITCH1 may check the memory address range of the partial memory region PMR allocated to the processing node 11, in the allocation information ASS1.

For operation S17, the switch node SWITCH1 may convert the virtual address VA1 included in the first memory access request, into a memory address MA1 included in the memory address range of the allocation information ASS1, and may manage the mapping information between the virtual address VA1 and the memory address MA1. The switch node SWITCH1 may memorize the mapping of the virtual address VA1 and the memory address MA1 as mapping information MAP1.

For operation S18, the switch node SWITCH1 may transmit a second memory access request for the memory address MA1, to the pooled memory node PDM1.

For operation S19, the pooled memory node PDM1 may receive the second memory access request transmitted from the switch node SWITCH1, and may perform a memory access operation for the memory address MA1 of the partial memory region PMR.

Summarizing, the data processing system 10 of FIG. 2 in accordance with the embodiment may efficiently allocate resources to task processing because the master node MASTER1 manages all resources including the processing node 11 and the pooled memory node PDM1.

Also, because the pooled memory node PDM1 is coupled to the switch node SWITCH1 independently of the processing nodes PU1, the sub system SUBSYS1 may be easily extended to include a plurality of pooled memory nodes. In other words, while one pooled memory node PDM1 is coupled to the switch node SWITCH1 in the sub system SUBSYS1 of FIG. 2, at least two pooled memory nodes may be respectively coupled to the switch node SWITCH1 independently of the processing nodes PU1 in accordance with an embodiment. In this case, a method for performing a task delegating operation and a task processing operation may be substantially the same as described above.

When the switch node SWITCH1 is coupled to a plurality of pooled memory nodes, the master node MASTER1 may determine which pooled memory node among the pooled memory nodes to be allocated to the processing node 11. Therefore, the allocation information ASS1 transmitted to the switch node SWITCH1 from the master node MASTER1 may include information on a pooled memory node allocated to the processing node 11 among the plurality of pooled memory nodes. The switch node SWITCH1 may select a pooled memory node to which a memory access request is to be transmitted, among the plurality of pooled memory nodes, based on the allocation information ASS1.

Figure 4:
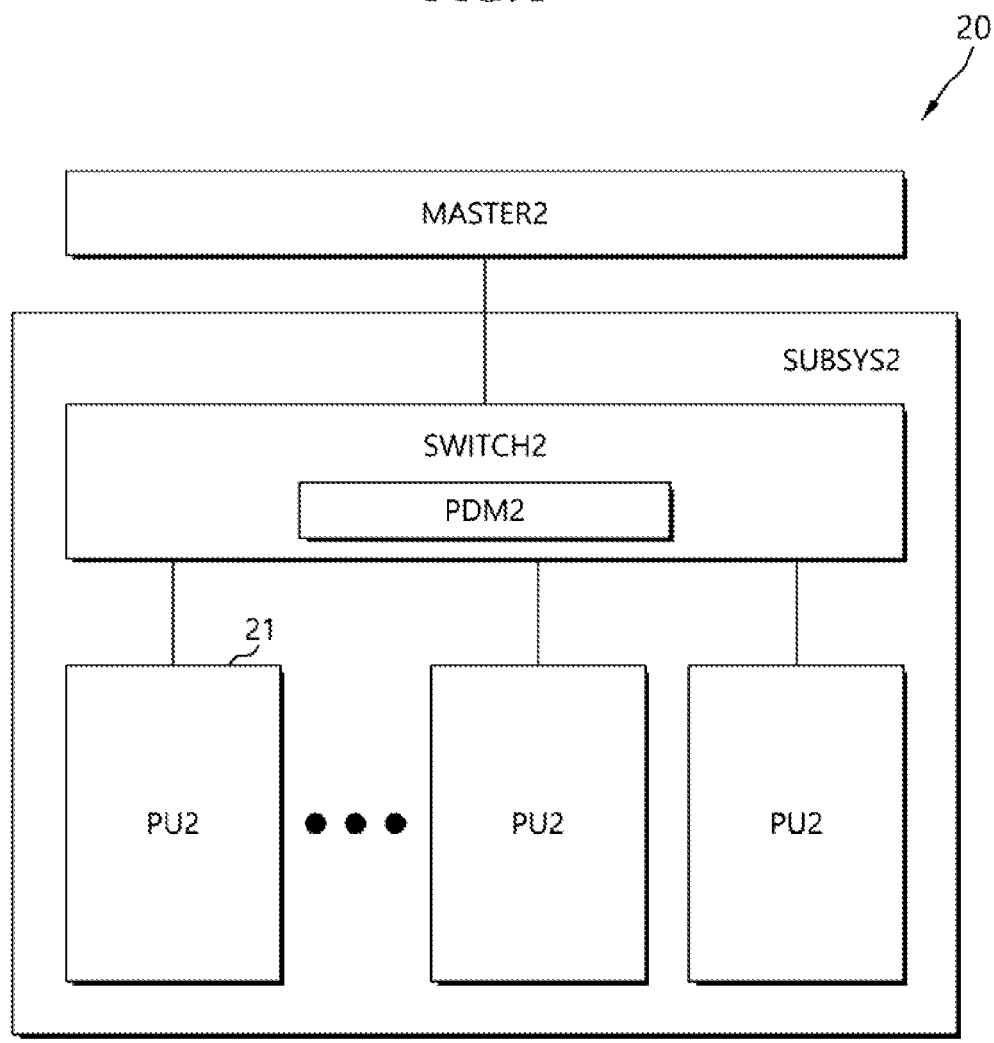
FIG. 4 shows a block diagram of a data processing system in accordance with an embodiment.

FIG. 4 shows a data processing system 20 in accordance with an embodiment.

Referring to FIG. 4, the data processing system 20 may include a master node MASTER2 and a sub system SUBSYS2. The master node MASTER2 may be coupled with the sub system SUBSYS2. The sub system SUBSYS2 may include a switch node SWITCH2 and a plurality of processing nodes PU2. Unlike the embodiment of FIG. 2 in which the pooled memory node PDM1 is structured to be physically independent of the switch node SWITCH1, in the embodiment of FIG. 4, the switch node SWITCH2 may include pooled memory PDM2 which plays the role of the pooled memory node PDM1 of FIG. 2.

Even in the case where the switch node SWITCH2 includes the pooled memory PDM2, the master node MASTER2 may perform a task delegating operation in the same manner as the master node MASTER1 of FIG. 2 performs the task delegating operation.

In detail, in order to delegate task processing to a processing node 21, the master node MASTER2 may allocate the memory address range of the pooled memory PDM2 to the processing node 21, and may transmit allocation information including the memory address range and the identification information of the processing node 21 to the switch node SWITCH2. Further, the master node MASTER2 may transmit task information including a memory capacity corresponding to the memory address range to the processing node 21 through the switch node SWITCH2.

The processing nodes PU2 may perform a task processing operation in the same manner as the processing node 11 of FIG. 2 performs the task processing operation.

In detail, the processing node 21 which is delegated with task processing may determine a virtual address range based on the memory capacity included in the task information, and may transmit a memory access request for a virtual address included in the virtual address range, to the switch node SWITCH2.

The switch node SWITCH2 may operate similarly to the switch node SWITCH1 of FIG. 2. In detail, the switch node SWITCH2 may process the memory access request by comparing the identification information transmitted from the master node MASTER2 and the identification information included in the memory access request received from the processing node 21. Also, the switch node SWITCH2 may convert the virtual address included in the memory access request, into a memory address of the memory address range transmitted from the master node MASTER2. The switch node SWITCH2 may manage the mapping information between the virtual address and the memory address.

When the switch node SWITCH2 processes the memory access request, latency may be reduced when compared to the data processing system 10 of FIG. 2.

In detail, when the switch node SWITCH1 of FIG. 2 is physically separated from the pooled memory node PDM1 and is coupled thereto through a cable, the switch node SWITCH1 may transmit the memory access request to the pooled memory node PDM1 through packetizing. However, the switch node SWITCH2 of FIG. 4 may process the memory access request through the memory interface of the pooled memory PDM2, for example, a DIMM (dual in-line memory module) interface, and thereby, may control the pooled memory PDM2 to perform a memory access operation. In this way, when the switch node SWITCH2 controls the pooled memory PDM2 disposed therein, through the memory interface, because packetizing as in the switch node SWITCH1 of FIG. 2 is not required, a latency due to the packetizing may be eliminated.

The other configuration and operating method of the data processing system 20 of FIG. 4 are the same as the configuration and operating method of the data processing system 10 of FIG. 2, and therefore, detailed descriptions thereof is omitted herein.

Figure 5:
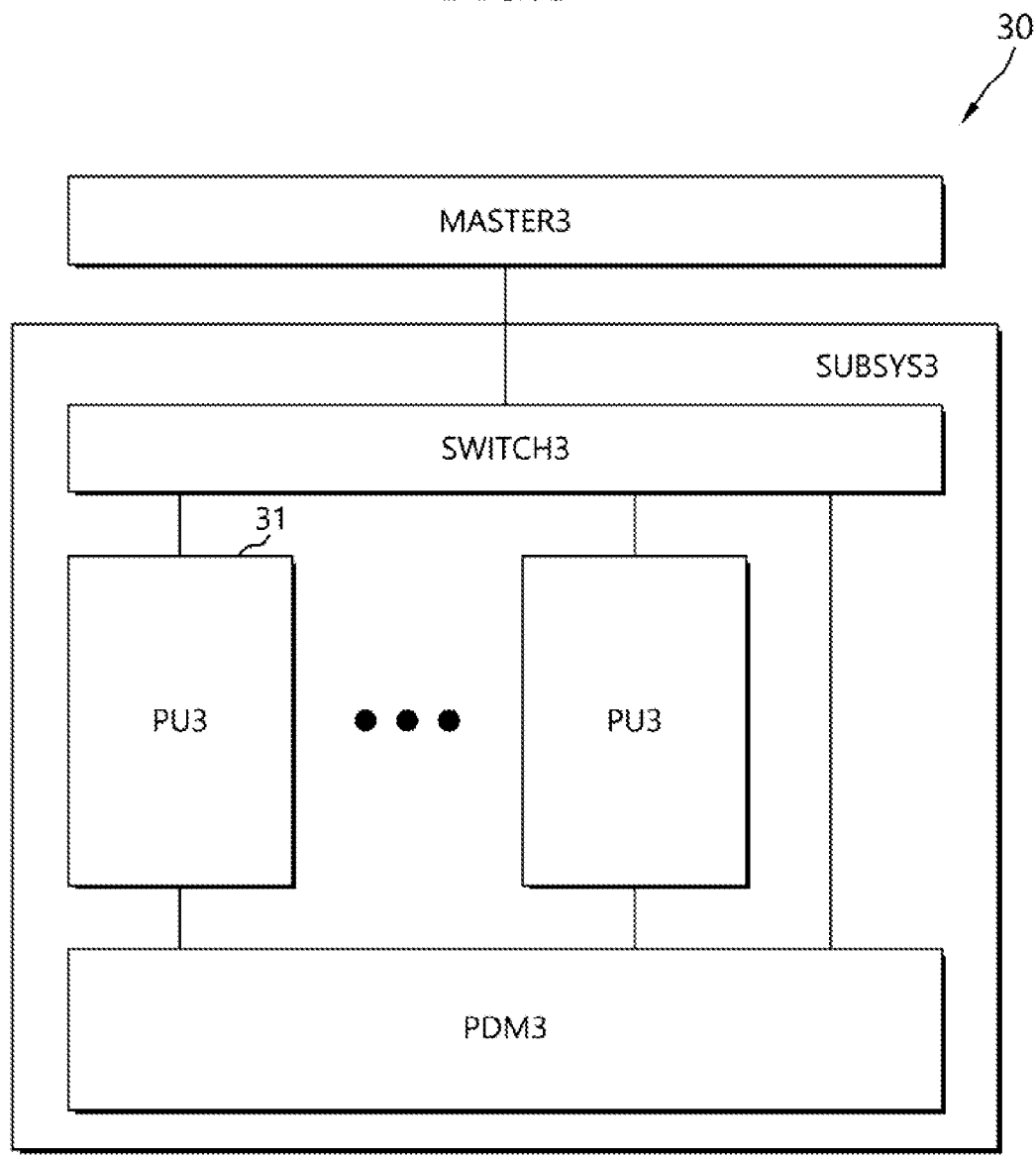
FIG. 5 shows a block diagram of a data processing system in accordance with an embodiment.

FIG. 5 shows a block diagram illustrating a data processing system 30 in accordance with an embodiment.

Referring to FIG. 5, the data processing system 30 may include a master node MASTER3 and a sub system SUBSYS3.

The master node MASTER3 may be coupled with the sub system SUBSYS3.

The sub system SUBSYS3 may include a switch node SWITCH3, one or more processing nodes PU3, and a pooled memory node PDM3.

The switch node SWITCH3 may be coupled with the master node MASTER3. The switch node SWITCH3 may be coupled with the master node MASTER3 through one or more upper switch nodes. The switch node SWITCH3 may be coupled to the processing nodes PU3 and the pooled memory node PDM3.

The processing nodes PU3 may be directly coupled with the pooled memory node PDM3.

The master node MASTER3 may perform a task delegating operation to the processing nodes PU3 and the pooled memory node PDM3 when a task is generated. In detail, the master node MASTER3 may determine to delegate task processing to any one of the processing nodes PU3, for example, a processing node 31. The master node MASTER3 may determine a memory address range to be allocated to the processing node 31, in the pooled memory node PDM3. That is to say, the master node MASTER3 may determine a partial memory region to be allocated to the processing node 31, in the memory region of the pooled memory node PDM3. Because the master node MASTER3 manages the statuses of all resources, the master node MASTER3 may determine the processing node 31 to which task processing is to be delegated and the memory address range to be allocated to the processing node 31.

The master node MASTER3 may transmit allocation information on the processing node 31 and the pooled memory node PDM3 to the pooled memory node PDM3.

The allocation information may include the identification information of the processing node 31 and the memory address range of the partial memory region allocated to the processing node 31 in the pooled memory node PDM3. The transmission of the allocation information to the pooled memory node PDM3 by the master node MASTER3 may be processed by the information transfer operation of the switch node SWITCH3.

That is to say, unlike the master node MASTER1 of FIG. 1 transmitting the allocation information to the switch node SWITCH1, the master node MASTER3 may transmit the allocation information to the pooled memory node PDM3. This is because each of the processing nodes PU3 directly transmits a memory access request to the pooled memory node PDM3 directly coupled thereto, as is described below. The pooled memory node PDM3 may process the memory access request directly received from each of the processing nodes PU3, based on the allocation information transmitted from the master node MASTER3.

The master node MASTER3 may transmit task information to the processing node 31 to which task processing is to be delegated. The task information may include the memory capacity of the partial memory region allocated to the processing node 31 in the pooled memory node PDM3 and the contents of a task that is delegated to the processing node 31. The transmission of the task information to the processing node 31 by the master node MASTER3 may be processed by the information transfer operation of the switch node SWITCH3.

The switch node SWITCH3 may perform the information transfer operation between the master node MASTER3 and the processing nodes PU3 and the pooled memory node PDM3. In detail, when the master node MASTER3 transmits the allocation information to the pooled memory node PDM3, the switch node SWITCH3 may transmit the allocation information transmitted from the master node MASTER3, to the pooled memory node PDM3 through the information transfer operation. Also, when the master node MASTER3 transmits the task information to the processing node 31, the switch node SWITCH3 may transmit the task information transmitted from the master node MASTER3, to the processing node 31 through the information transfer operation.

The processing node 31 may process the task delegated from the master node MASTER3, by performing a task processing operation. In order to perform the task processing operation, the processing node 31 may check the task information transmitted from the master node MASTER3. The processing node 31 may determine to use a predetermined virtual address range, by checking the task information. The virtual address range may correspond to the allocated memory capacity included in the task information.

The processing node 31 may transmit a memory access request to the pooled memory node PDM3. The memory access request may include a virtual address. The virtual address may be included in the virtual address range that is determined to be used in task processing, by the processing node 31.

The pooled memory node PDM3 may check the allocation information on the processing node 31, in response to the memory access request transmitted from the processing node 31. The pooled memory node PDM3 may check the identification information of the processing node 31 in the allocation information, and may compare it with the identification information of the processing node 31 included in the memory access request.

The pooled memory node PDM3 may check the memory address range of the pooled memory node PDM3 allocated to the processing node 31, in the allocation information. The pooled memory node PDM3 may convert the virtual address included in the memory access request, into a memory address included in the memory address range of the allocation information. The pooled memory node PDM3 may manage the mapping information between the virtual address and the memory address.

The pooled memory node PDM3 may perform a memory access operation for the memory address. In other words, because the pooled memory node PDM3 is directly coupled with the processing nodes PU3, the pooled memory node PDM3 may receive a memory access request directly from the processing nodes PU3, and may determine by itself whether to permit the memory access.

According to an embodiment, the sub system SUBSYS3 may include a plurality of pooled memory nodes. The respective pooled memory nodes may be coupled to the switch node SWITCH3 and may be coupled to each of the processing nodes PU3. Namely, each of the processing nodes PU3 may be directly coupled to the plurality of pooled memory nodes. In this case, the master node MASTER3 may determine which pooled memory node among the pooled memory nodes to allocate to the processing node 31. Therefore, the task information transmitted to the processing node 31 from the master node MASTER3 may include information on a pooled memory node allocated to the processing node 31 among the plurality of pooled memory nodes. That is to say, unlike information on an allocated pooled memory node being transmitted to the switch node SWITCH1 in the data processing system 10 of FIG. 2, information on an allocated pooled memory node may be transmitted to the processing node 31 in the data processing system 30 of FIG. 5. This is because the processing node 31 of the data processing system 30 of FIG. 5 is able to transmit a memory access request directly to the pooled memory nodes without going through the switch node SWITCH3. In other words, the processing node 31 may select a pooled memory node to which a memory access request is to be transmitted, among the plurality of pooled memory nodes, based on the task information.

Figure 6A:
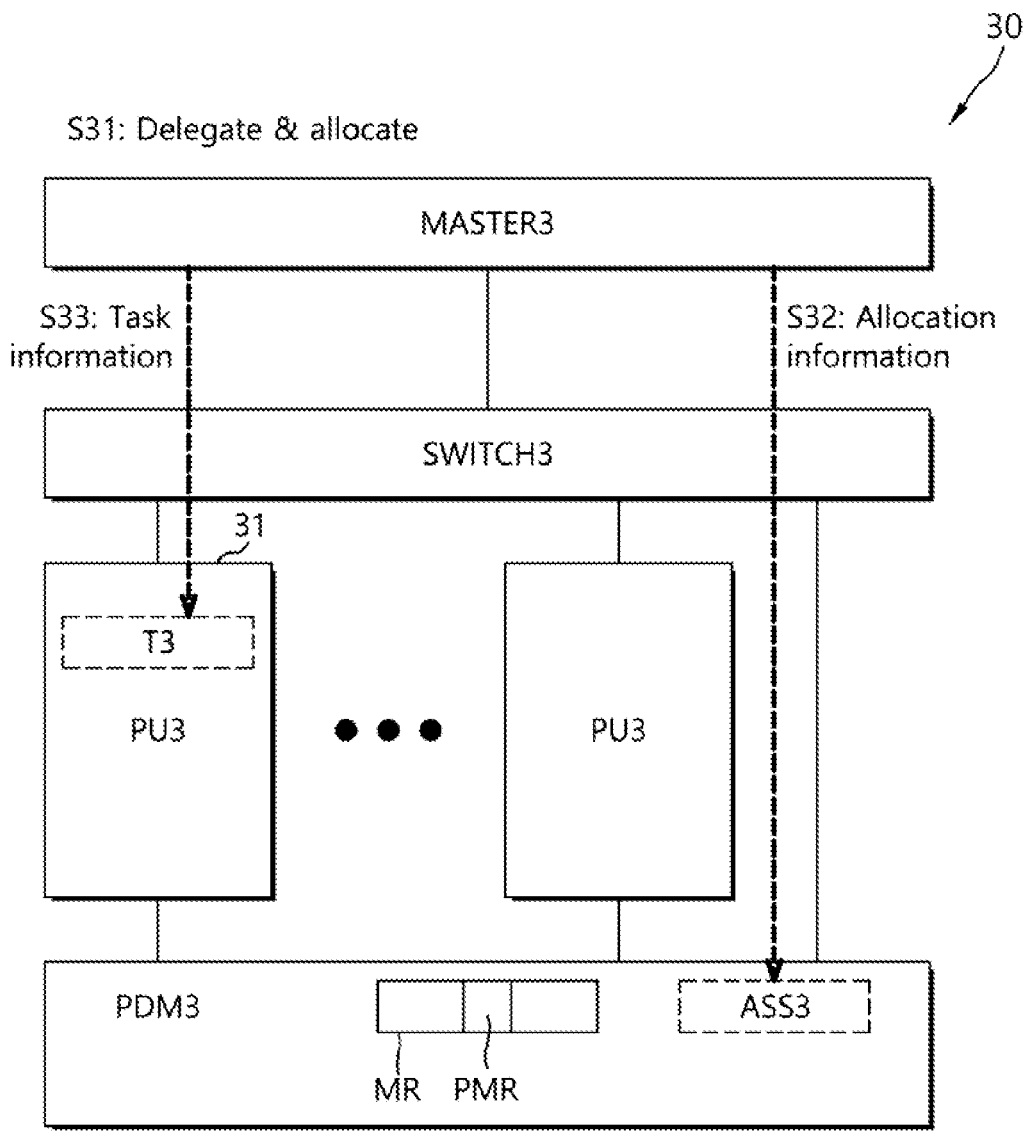
FIGS. 6A and 6B show diagrams to assist in the explanation of a method for operating the data processing system of FIG. 5 in accordance with an embodiment.
Figure 6B:
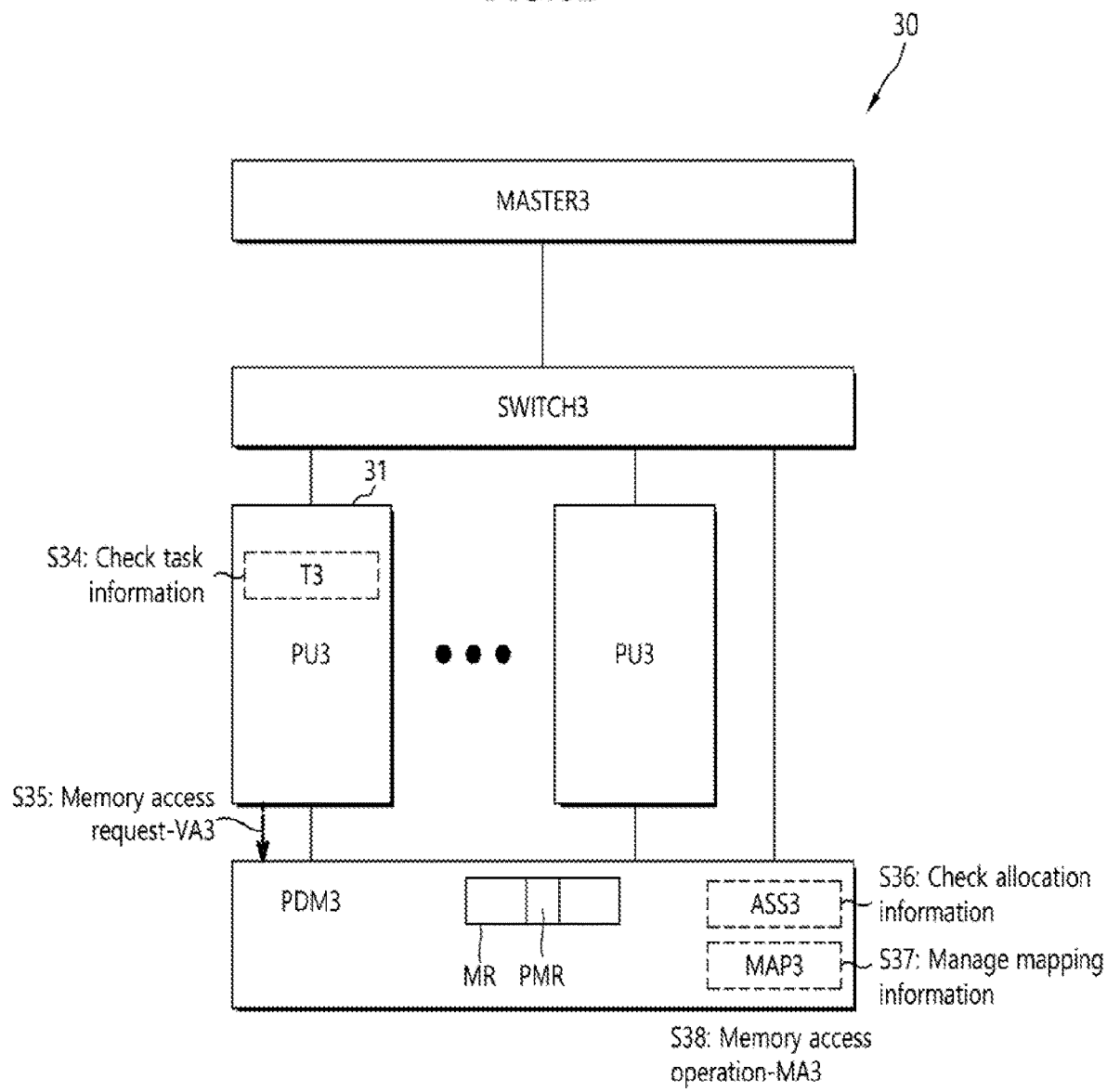

FIGS. 6A and 6B show diagrams to assist in the explanation of a method for operating the data processing system 30 of FIG. 5 in accordance with an embodiment. In FIG. 6A, the master node MASTER3 may perform a task delegating operation, and in FIG. 6B, the processing node 31 may perform a task processing operation.

Referring to FIG. 6A, for operation S31, the master node MASTER3 may determine to delegate task processing to the processing node 31. The master node MASTER3 may determine a memory address range to be allocated to the processing node 31, in the pooled memory node PDM3. That is to say, the master node MASTER3 may determine a partial memory region PMR to be allocated to the processing node 31, in an entire memory region MR of the pooled memory node PDM3.

For operation S32, the master node MASTER3 may transmit allocation information ASS3 on the processing node 31 and the pooled memory node PDM3 to the pooled memory node PDM3. The allocation information ASS3 may include the identification information of the processing node 31 and the memory address range of the partial memory region PMR. The pooled memory node PDM3 may store the allocation information ASS3 in an internal memory. On the other hand, the switch node SWITCH3 may transmit the allocation information ASS3 transmitted from the master node MASTER3, to the pooled memory node PDM3 through an information transfer operation.

For operation S33, the master node MASTER3 may transmit task information T3 to the processing node 31. The task information T3 may include the memory capacity of the partial memory region PMR allocated to the processing node 31 and the contents of a task that is delegated to the processing node 31. The processing node 31 may store the task information T3 in an internal memory. On the other hand, the switch node SWITCH3 may transmit the task information T3 transmitted from the master node MASTER3, to the processing node 31 through an information transfer operation.

Meanwhile, the operation S33 may be performed after the operation S32 is performed, or vice versa.

Referring to FIG. 6B, for operation S34, the processing node 31 may check the task information T3 to perform the task processing operation. The processing node 31 may determine to use a predetermined virtual address range, by checking the task information T3. The virtual address range may correspond to the memory capacity of the partial memory region PMR included in the task information T3.

For operation S35, the processing node 31 may transmit a memory access request to the pooled memory node PDM3. The memory access request may include a virtual address VA3. The virtual address VA3 may be included in the virtual address range that is determined to be used in task processing.

For operation S36, the pooled memory node PDM3 may check the allocation information ASS3 on the processing node 31, in response to the memory access request transmitted from the processing node 31. The pooled memory node PDM3 may check the identification information of the processing node 31 in the allocation information ASS3, and may compare it with the identification information of the processing node 31 included in the memory access request. The pooled memory node PDM3 may check the memory address range of the partial memory region PMR allocated to the processing node 31, in the allocation information ASS3.

For operation S37, the pooled memory node PDM3 may convert the virtual address VA3 included in the memory access request, into a memory address MA3 included in the memory address range of the allocation information ASS3, and may manage the mapping information between the virtual address VA3 and the memory address MA3. The pooled memory node PDM3 may memorize the mapping of the virtual address VA3 and the memory address MA3 as mapping information MAP3.

For operation S38, the pooled memory node PDM3 may perform a memory access operation for the memory address MA3 of the partial memory region PMR.

Summarizing theses, the data processing system 30 of FIG. 5 in accordance with the embodiment may efficiently allocate resources to task processing because the master node MASTER3 manages all resources including the processing node 31 and the pooled memory node PDM3.

Also, because the pooled memory node PDM3 is directly coupled to the processing nodes PU3, the pooled memory node PDM3 may receive a memory access request directly from the processing nodes PU3 without going through a switch server. Therefore, a bottleneck phenomenon may be suppressed, and task processing may be quickly performed.

Figure 7:
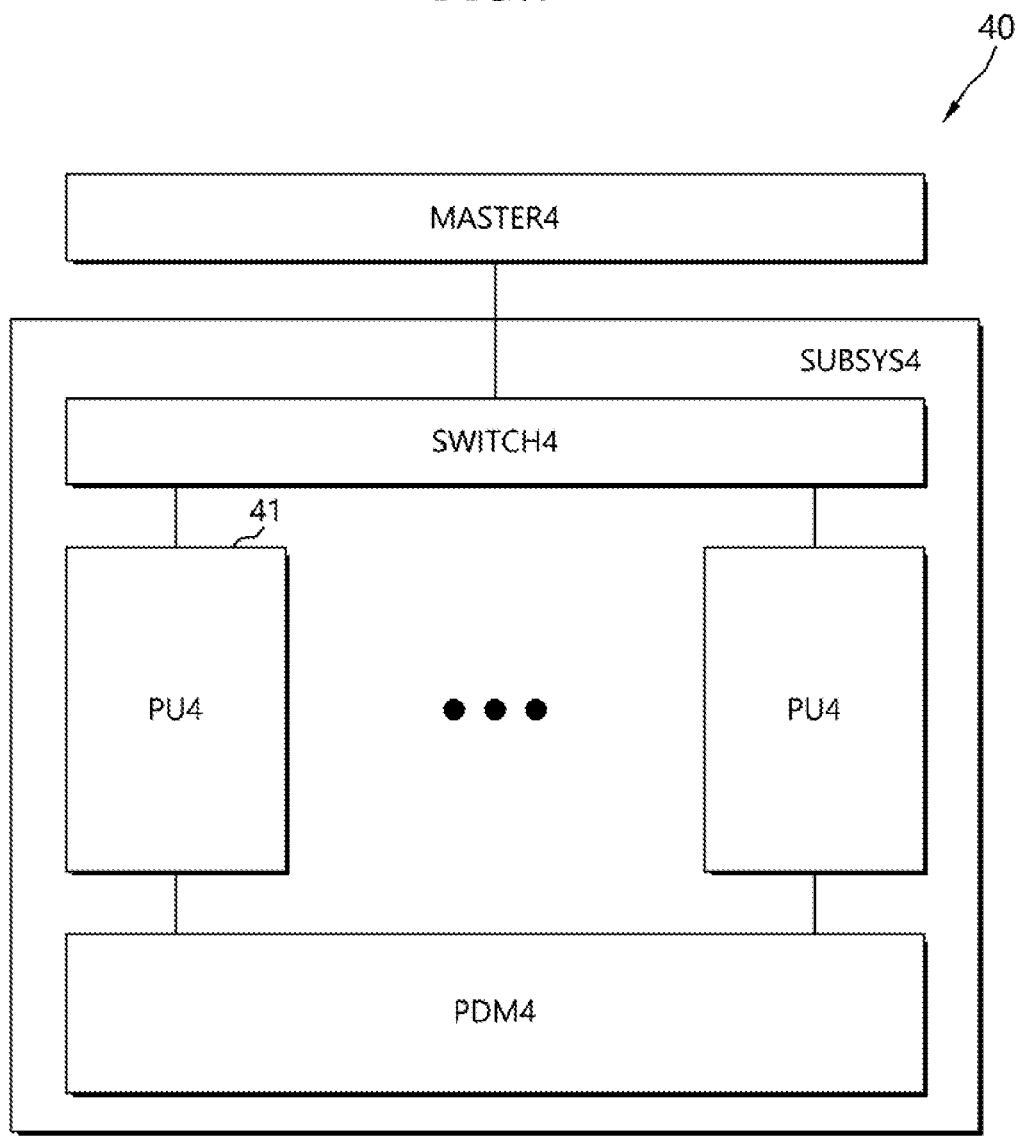
FIG. 7 shows a block diagram of a data processing system in accordance with an embodiment.

FIG. 7 shows a block diagram illustrating a data processing system 40 in accordance with an embodiment.

Referring to FIG. 7, the data processing system 40 may include a master node MASTER4 and a sub system SUBSYS4.

The master node MASTER4 may be coupled with the sub system SUBSYS4.

The sub system SUBSYS4 may include a switch node SWITCH4, one or more processing nodes PU4 and a pooled memory node PDM4.

The switch node SWITCH4 may be coupled with the master node MASTER4. The switch node SWITCH4 may be coupled with the master node MASTER4 through one or more upper switch nodes. The switch node SWITCH4 may be coupled to the processing nodes PU4.

The processing nodes PU4 may be directly coupled with the pooled memory node PDM4.

The pooled memory node PDM4 may be directly coupled with the processing nodes PU4. Unlike the pooled memory node PDM3 of FIG. 5 being coupled with the switch node SWITCH3, the pooled memory node PDM4 might not be coupled with the switch node SWITCH4.

The master node MASTER4 may perform a task delegating operation to the processing nodes PU4 when a task is generated. In detail, the master node MASTER4 may determine to delegate task processing to any one of the processing nodes PU4, for example, a processing node 41. The master node MASTER4 may transmit a memory check request to the processing node 41. The memory check request may include information on a memory capacity which should be allocated to the processing node 41 for task processing.

The master node MASTER4 may receive an allocation result from the processing node 41, as a response to the memory check request. The allocation result may include whether allocation in the pooled memory node PDM4 has succeeded or failed. If the master node MASTER4 receives the allocation result of an allocation success from the processing node 41, the master node MASTER4 may transmit task information to the processing node 41. The task information may include the contents of a task that is delegated to the processing node 41.

However, if the master node MASTER4 receives the allocation result of an allocation failure from the processing node 41, in order to delegate task processing to a processing node of another sub system (not shown), the master node MASTER4 may transmit a memory check request to the corresponding processing node.

That is to say, because the master node MASTER4 is not coupled with the pooled memory node PDM4 through the switch node SWITCH4 unlike the master nodes MASTER1, MASTER2, and MASTER3 of FIGS. 2, 4 and 5, the master node MASTER4 might not be aware of the status of the pooled memory node PDM4. Therefore, the master node MASTER4 might not directly allocate the memory address range of the pooled memory node PDM4 to the processing node 41.

The switch node SWITCH4 may perform an information transfer operation between the master node MASTER4 and the processing nodes PU4. In detail, when the master node MASTER4 transmits the memory check request or the task information to the processing node 41, the switch node SWITCH4 may transmit the memory check request or the task information transmitted from the master node MASTER4, to the processing node 41 through the information transfer operation. When the processing node 41 transmits the allocation result to the master node MASTER4, the switch node SWITCH4 may transmit the allocation result transmitted from the processing node 41, to the master node MASTER4 through an information transfer operation.

The processing node 41 may transmit an allocation request to the pooled memory node PDM4 in response to the memory check request transmitted from the master node MASTER4. The allocation request may include information on the memory capacity which should be allocated to the processing node 41. The processing node 41 may transmit the allocation result notifying that allocation has succeeded/failed, to the master node MASTER4, in response to a response of an allocation success/failure transmitted from the pooled memory node PDM4.

The processing node 41 may process the task delegated from the master node MASTER4, by performing a task processing operation. In order to perform the task processing operation, the processing node 41 may check the task information transmitted from the master node MASTER4. The task information may include the contents of the task that is delegated to the processing node 41. The processing node 41 may manage the memory capacity allocated from the pooled memory node PDM4, together as the task information.

The processing node 41 may determine to use a predetermined virtual address range. The virtual address range may correspond to the memory capacity allocated to the processing node 41.

The processing node 41 may transmit a memory access request to the pooled memory node PDM4. The memory access request may include a virtual address. The virtual address may be included in the virtual address range that is determined to be used in task processing, by the processing node 41.

The pooled memory node PDM4 may allocate a partial memory region of its memory region to the processing node 41 and generate allocation information, in response to the allocation request transmitted from the processing node 41. The allocation information may include the identification information of the processing node 41 and the memory address range of the partial memory region. The pooled memory node PDM4 may transmit a response of an allocation success to the processing node 41.

Meanwhile, in the case where a memory region to be allocated to the processing node 41 does not exist when the allocation request is received from the processing node 41, the pooled memory node PDM4 may transmit a response of an allocation failure to the processing node 41.

The pooled memory node PDM4 may check the allocation information on the processing node 41, in response to the memory access request transmitted from the processing node 41. The pooled memory node PDM4 may check the identification information of the processing node 41 in the allocation information, and may compare it with the identification information of the processing node 41 included in the memory access request.

The pooled memory node PDM4 may check the memory address range of the pooled memory node PDM4 allocated to the processing node 41, in the allocation information. The pooled memory node PDM4 may convert the virtual address included in the memory access request, into a memory address included in the memory address range of the allocation information. The pooled memory node PDM4 may manage the mapping information between the virtual address and the memory address.

The pooled memory node PDM4 may perform a memory access operation for the memory address. In other words, because the pooled memory node PDM4 is directly coupled with the processing nodes PU4, the pooled memory node PDM4 may receive a memory access request directly from the processing nodes PU4, and may determine by itself whether to permit the memory access.

According to an embodiment, the sub system SUBSYS4 may include a plurality of pooled memory nodes. The respective pooled memory nodes may be coupled to each of the processing nodes PU4. Namely, each of the processing nodes PU4 may be directly coupled to the plurality of pooled memory nodes. The respective pooled memory nodes might not be directly coupled with the switch node SWITCH4.

Figure 8B:
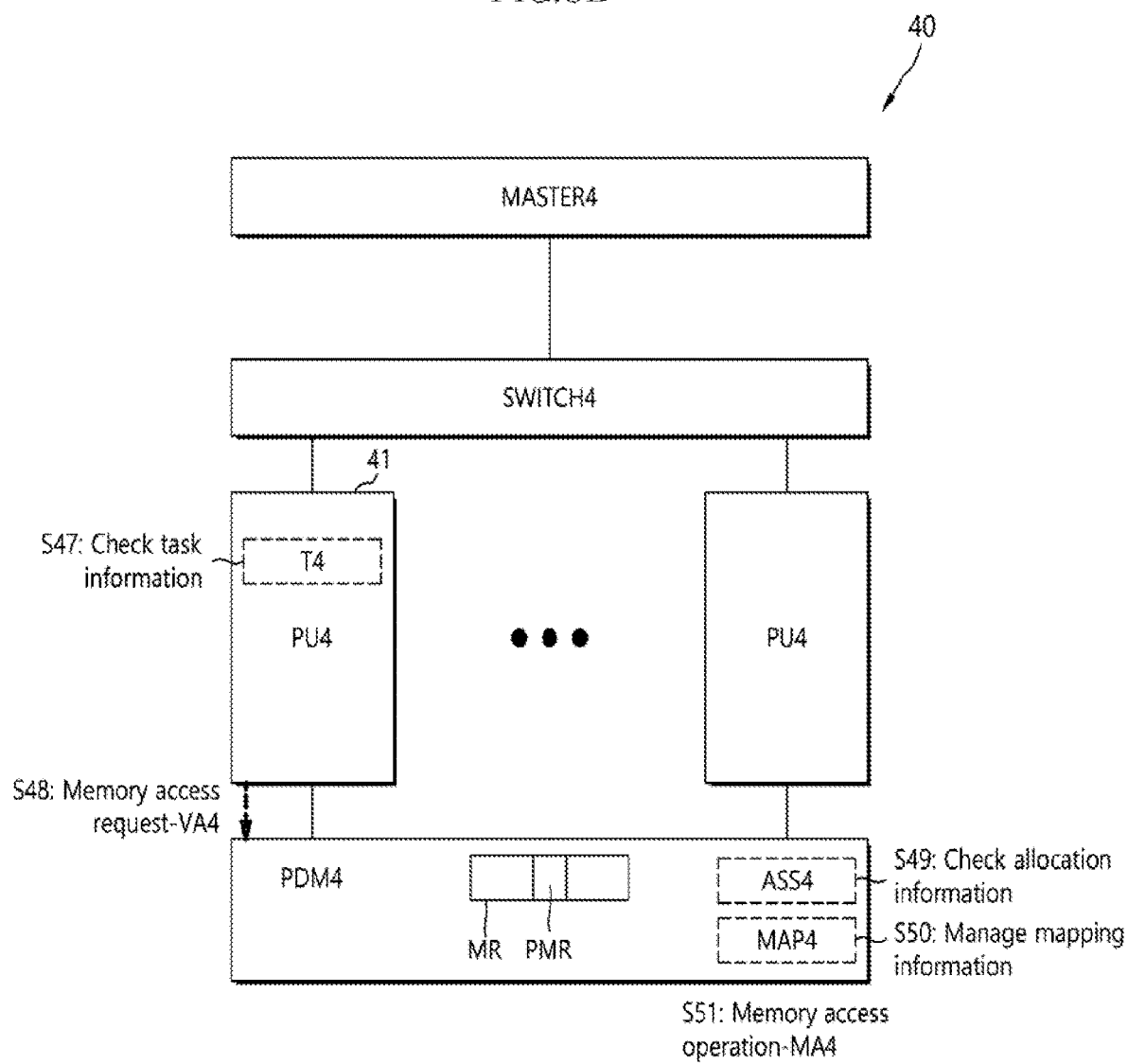

FIGS. 8A and 8B show diagrams to assist in the explanation of a method for operating the data processing system 40 of FIG. 7 in accordance with an embodiment. In FIG. 8A, the master node MASTER4 may perform a task delegating operation, and in FIG. 8B, the processing node 41 may perform a task processing operation.

Referring to FIG. 8A, for operation S41, the master node MASTER4 may transmit a memory check request to the processing node 41. The memory check request may include information on a memory capacity which should be allocated to the processing node 41. On the other hand, the switch node SWITCH4 may transmit the memory check request transmitted from the master node MASTER4 to the processing node 41 through an information transfer operation.

For operation S42, the processing node 41 may transmit an allocation request to the pooled memory node PDM4 in response to the memory check request transmitted from the master node MASTER4. The allocation request may include information on the memory capacity which should be allocated to the processing node 41.

For operation S43, the pooled memory node PDM4 may allocate a partial memory region PMR of an entire memory region MR to the processing node 41 and generate allocation information ASS4, in response to the allocation request transmitted from the processing node 41. The allocation information ASS4 may include the identification information of the processing node 41 and the memory address range of the partial memory region PMR. The pooled memory node PDM4 may store the allocation information ASS4 in an internal memory.

For operation S44, the pooled memory node PDM4 may transmit a response of an allocation success to the processing node 41.

For operation S45, the processing node 41 may transmit an allocation result reporting that allocation has succeeded, to the master node MASTER4, in response to the response of the allocation success transmitted from the pooled memory node PDM4. On the other hand, the switch node SWITCH4 may transmit the allocation result transmitted from the processing node 41, to the master node MASTER4 through an information transfer operation.

For operation S46, the master node MASTER4 may transmit task information T4 to the processing node 41 in response to the allocation result transmitted from the processing node 41. The task information T4 may include the contents of a task that is delegated to the processing node 41. The processing node 41 may manage the memory capacity allocated from the pooled memory node PDM4, together as the task information T4. The processing node 41 may store the task information T4 in an internal memory. On the other hand, the switch node SWITCH4 may transmit the task information T4 transmitted from the master node MASTER4, to the processing node 41 through an information transfer operation.

Referring to FIG. 8B, for operation S47, the processing node 41 may check the task information T4 to perform the task processing operation. The processing node 41 may determine to use a predetermined virtual address range, by checking the task information T4. The virtual address range may correspond to the memory capacity of the partial memory region PMR included in the task information T4.

For operation S48, the processing node 41 may transmit a memory access request to the pooled memory node PDM4. The memory access request may include a virtual address VA4. The virtual address VA4 may be included in the virtual address range that is determined to be used in task processing.

For operation S49, the pooled memory node PDM4 may check the allocation information ASS4 on the processing node 41, in response to the memory access request transmitted from the processing node 41. The pooled memory node PDM4 may check the identification information of the processing node 41 in the allocation information ASS4, and may compare it with the identification information of the processing node 41 included in the memory access request. The pooled memory node PDM4 may check the memory address range of the partial memory region PMR allocated to the processing node 41, in the allocation information ASS4.

For operation S50, the pooled memory node PDM4 may convert the virtual address VA4 included in the memory access request, into a memory address MA4 included in the memory address range of the allocation information ASS4, and may manage the mapping information between the virtual address VA4 and the memory address MA4. The pooled memory node PDM4 may memorize the mapping of the virtual address VA4 and the memory address MA4 as mapping information MAP4.

For operation S51, the pooled memory node PDM4 may perform a memory access operation for the memory address MA4 of the partial memory region PMR.

Figure 9:
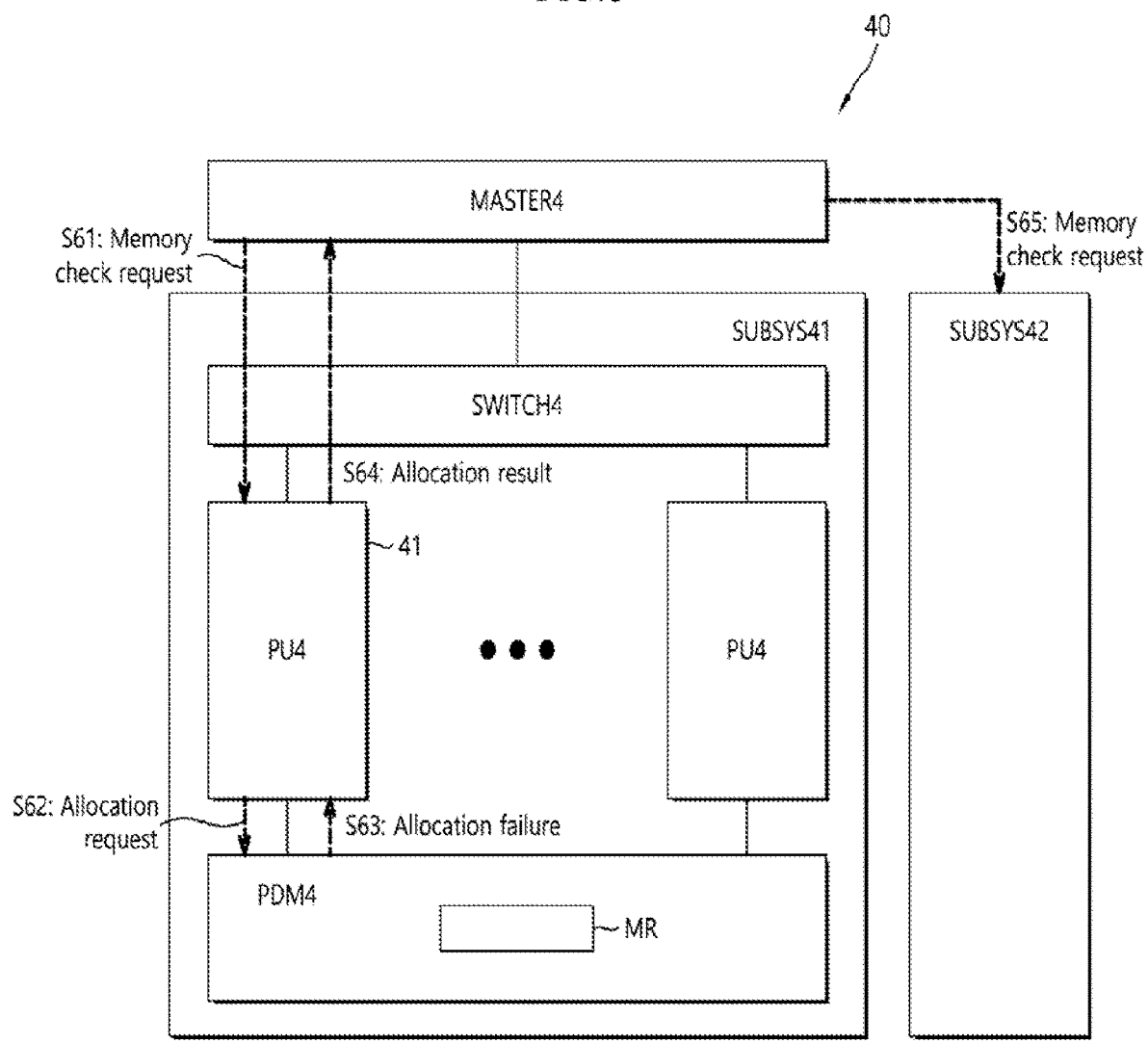
FIG. 9 shows a diagram to assist in the explanation of a method for operating the data processing system of FIG. 7 in accordance with an embodiment.

FIG. 9 shows a diagram to assist in the explanation of a method for operating the data processing system 40 of FIG. 7 in accordance with an embodiment. The data processing system 40 may include sub systems SUBSYS41 and SUBSYS42 which are configured and operate in the same manner as the sub system SUBSYS4 of FIG. 7. FIG. 9 shows a method for the master node MASTER4 to repeat a task delegating operation in the other sub system SUBSYS42 when allocation of a pooled memory node in the sub system SUBSYS41 fails.

In detail, referring to FIG. 9, for operation S61, the master node MASTER4 may transmit a memory check request to the processing node 41. The memory check request may include information on a memory capacity which should be allocated to the processing node 41. On the other hand, the switch node SWITCH4 may transmit the memory check request transmitted from the master node MASTER4, to the processing node 41 through an information transfer operation.

For operation S62, the processing node 41 may transmit an allocation request to the pooled memory node PDM4 in response to the memory check request transmitted from the master node MASTER4. The allocation request may include information on the memory capacity which should be allocated to the processing node 41.

For operation S63, the pooled memory node PDM4 may transmit a response of an allocation failure to the processing node 41 when a memory region to be allocated does not exist in an entire memory region MR, in response to the allocation request transmitted from the processing node 41.

For operation S64, the processing node 41 may transmit an allocation result notifying that allocation has failed, to the master node MASTER4, in response to the response of the allocation failure transmitted from the pooled memory node PDM4. On the other hand, the switch node SWITCH4 may transmit the allocation result transmitted from the processing node 41, to the master node MASTER4 through an information transfer operation.

For operation S65, the master node MASTER4 may receive the allocation result of the allocation failure transmitted from the processing node 41, and may transmit a memory check request to a processing node (not shown) of the other sub system SUBSYS42. The sub system SUBSYS42 may operate similarly as the sub system SUBSYS41 operates in FIG. 8A or 9, in response to the memory check request transmitted from the master node MASTER4.

According to an embodiment, the sub system SUBSYS41 may further include pooled memory nodes in addition to the pooled memory node PDM4, and the respective pooled memory nodes may be coupled to each of the processing nodes PU4. In this case, when a memory check request is received from the master node MASTER4, the processing node 41 may transmit an allocation request to another pooled memory node when allocation in the pooled memory node PDM4 fails. When allocation in all pooled memory nodes fails, the processing node 41 may transmit an allocation result reporting that allocation has failed, to the master node MASTER4.

While various embodiments have been described above, it will be understood by those skilled in the art that the described embodiments serve as examples only. Accordingly, the computing system and the data processing system including the same described herein should not be limited based on the described embodiments.

What is claimed is:

1. A data processing system comprising:
at least one pooled memory node;
at least one processing node each coupled to a respective pooled memory node of the at least one pooled memory node;
a switch node coupled to the at least one processing node; and
a master node configured to communicate with the at least one processing node through the switch node, configured to control a first processing node among the at least one processing node to be allocated with a memory capacity for task processing, directly from the at least one pooled memory node, and configured to delegate the task processing to the first processing node according to a result of allocation with the memory capacity,
wherein the first processing node is delegated with the task processing by transmitting the result of the allocation to the master node according to a response of an allocation success transmitted from a first pooled memory node among the at least one pooled memory node.

2. The data processing system according to claim 1,
wherein the first processing node transmits a memory allocation request for the memory capacity, directly to the first pooled memory node under control of the master node.

3. The data processing system according to claim 2,
wherein the first processing node determines a virtual address range based on the memory capacity, and transmits a memory access request for a virtual address included in the virtual address range, to the first pooled memory node, for the task processing.

4. The data processing system according to claim 2,
wherein the first pooled memory node allocates a memory address range corresponding to the memory capacity to the first processing node, in response to the memory allocation request.

5. The data processing system according to claim 4,
wherein the first pooled memory node processes the memory access request transmitted by the first processing node for the task processing, based on the memory address range.

6. The data processing system according to claim 5,
wherein the first pooled memory node converts the virtual address included in the memory access request into a memory address included in the memory address range, and performs a memory access operation for the memory address.

7. The data processing system according to claim 6,
wherein the first pooled memory node manages mapping information between the virtual address and the memory address.

8. The data processing system according to claim 1, further comprising:
second pooled memory nodes;
at least one second processing node each coupled to a respective second pooled memory node of the second pooled memory nodes; and
a second switch node coupled to the at least one second processing node,
wherein, when the first processing node is not allocated with the memory capacity from the at least one pooled memory node, the master node controls a processing node selected from among the at least one second processing node, through the second switch node, thereby delegating the task processing to the selected processing node.

9. A data processing system comprising:
at least one pooled memory node;
at least one processing node each coupled to a respective pooled memory node of the at least one pooled memory node;
a switch node coupled to the at least one processing node; and
a master node configured to communicate with the at least one processing node through the switch node, configured to receive a result of a memory allocation request from a first processing node among the at least one processing node, and configured to delegate task processing to the first processing node according to the result of the memory allocation request,
wherein a first pooled memory node among the at least one pooled memory node allocates a memory address range to the first processing node in response to the memory allocation request of the first processing node, and processes a memory access request transmitted by the first processing node for the task processing, based on the memory address range.

10. The data processing system according to claim 9,
wherein the master node transmits a memory check request for a memory capacity for the task processing, to the first processing node.

11. The data processing system according to claim 10,
wherein the first processing node transmits the memory allocation request for the memory capacity, directly to the first pooled memory node, in response to the memory check request, and transmits the result of the memory allocation request to the master node according to a response of an allocation success transmitted from the first pooled memory node.

12. The data processing system according to claim 10,
wherein the first processing node determines a virtual address range based on the memory capacity, and transmits the memory access request to the first pooled memory node, for a virtual address included in the virtual address range.

13. The data processing system according to claim 10, further comprising:
second pooled memory nodes;
at least one second processing node each coupled to a respective second pooled memory node of the second pooled memory nodes; and
a second switch node coupled to the at least one second processing node,
wherein, when the result of the memory allocation request is an allocation failure, the master node transmits a memory check request for the memory capacity to a second processing node selected among the at least one second processing node through the second switch node, and delegates the task processing to the second processing node based on a result of a memory allocation request of the second processing node.

14. The data processing system according to claim 9,
wherein the first pooled memory node converts the virtual address included in the memory access request, into a memory address included in the memory address range, and performs a memory access operation for the memory address.

15. The data processing system according to claim 14,
wherein the first pooled memory node manages mapping information between the virtual address and the memory address.

16. A computing system comprising:
at least one pooled memory node;
at least one processing node each coupled to a respective pooled memory node of the at least one pooled memory node; and
a switch node configured to couple the at least one processing node with an external master node,
wherein a first pooled memory node among the at least one pooled memory node allocates a memory address range to a first processing node among the at least one processing node in response to a memory allocation request of the first processing node and transmits a response of an allocation success to the first processing node, and
wherein the first processing node is delegated with task processing from the master node by transmitting the response of the allocation success to the master node.

17. The computing system according to claim 16,
wherein the first processing node transmits the memory allocation request for a memory capacity, to the first pooled memory node under control of the master node.

18. The computing system according to claim 17,
wherein the first processing node determines a virtual address range based on the memory capacity, and transmits a memory access request for the task processing to the first pooled memory node, for a virtual address included in the virtual address range.

19. The computing system according to claim 18,
wherein the first pooled memory node converts the virtual address into a memory address included in the memory address range, and performs a memory access operation for the memory address.

20. The computing system according to claim 19, wherein the first pooled memory node manages mapping information between the virtual address and the memory address.

* * * * *